United States Patent Office 2,900,351
Patented Aug. 18, 1959

2,900,351

ION EXCHANGE MATERIAL

Mayer B. Goren and Ira D. Elkins, Oklahoma City, Okla., assignors to Kerr-McGee Oil Industries Inc., a corporation of Delaware No Drawing. Application February 6, 1956
Serial No. 563,431

16 Claims. (Cl. 252—422)

This invention relates to activatable chars and activated carbons prepared from asphaltic bituminous materials. More particularly, the present invention relates to new and useful activatable chars and activated carbons and to the method of producing these products in which primary carbonization and subsequent more efficient activation is obtained without the difficulties generally encountered when employing prior art techniques for treating such materials.

By the term "asphaltic bituminous materials" as used hereinafter in the specification and claims is meant semi-solid to solid pyrogenous and naturally occurring asphalts (bitumens and pyrobitumens), one or more semi-solid to solid fractions or components thereof, or semi-solid to solid products obtained by blowing these materials or one or more of their components or fractions with air or an oxygen containing gas in the presence or absence of catalyst. Examples of such naturally occurring materials include gilsonite, grahamite, wurtzilite, albertite, elaterite, and native asphalts, such as Trinidad asphalts; examples of pyrogenous materials include propane asphalt, vacuum reduced crude, cracked tars, etc. Blown asphaltic bituminous materials include those blown with air or an oxygen containing gas either in the presence or absence of a catalyst, such as phosphorous pentoxide, ferric chloride, and cobaltic salts. By the term "components" or "fractions" of pyrogenous and naturally occurring asphalts is intended asphaltenes, resin and oil mixtures, and separate resin and oil fractions. These may be obtained, for example, by the method described in copending application Serial No. 218,480 filed March 30, 1951. Where the term "oil fraction" appears in the specification and claims, it is understood that the oil fraction is not used or claimed per se but has been blown or treated with a suitable chemical agent before the sulfonation step for the purpose of rendering the oil fraction a semi-solid to solid. The use of chemical treating agents such as aluminum chloride, boron fluoride, and chlorinated materials for this purpose is fully described in U.S. Patent No. 2,247,375.

Activatable chars and activated carbons have been prepared heretofore from asphaltic bituminous material, but the yield is usually very low and the product has undesirable characteristics rendering it unsatisfactory for most commercial uses, such as poor mechanical strength, poor resistance to attrition, and inferior adsorbent activities as compared with coconut charcoal adsorbents. In our copending application Serial No. 432,619 filed May 26, 1954, now U.S. Patent No. 2,809,938, we described a new method of obtaining improved yields of activatable chars and activated carbons which exhibit good activity and attrition resistance. The products produced therein are considerably better than somewhat similar prior art products but in some cases their activity is less than is desirable for most commercial adsorbents.

It is an object of the present invention to provide new and improved activatable chars and activated carbons from asphaltic bituminous material having superior adsorbent activities over prior art materials, which new products may be obtained in very good yield and exhibit good mechanical strength and excellent resistance toward attrition.

It is a further object of the present invention to provide a new and improved proces for producing the foregoing products from asphaltic bituminous materials.

These and other objects of the present invention will become more apparent to those skilled in the art from the following detailed description.

In accordance with the present invention, we have discovered that asphaltic bituminous material having a fusible non-asphaltic organic substance molecularly to macro-colloidally dispersed therein may be converted to a superior char by a series of steps involving sulfonation of this material in particulated form, removal of the unreacted sulfonation agent, drying the resultant product preferably at a temperature between about 300 to 450° C. and subsequent charring of this product at elevated temperatures and in the absence of oxygen. The resulting chars may be further activated by subjecting them to the action of a suitable carbon activating medium preferably at temperatures above 800° C.

The term "fusible non-asphaltic organic substance" as used in the specification and claims is intended to include those organic substances which are fusible, sulfuric acid reactive, and water or sulfuric acid extractable after reaction with the sulfonating agent. A wide variety of organic compounds are suitable for the purpose of the invention, including acidic organic substances such as phenols and basic organic substances such as amines of the primary, secondary and tertiary type. The lower amines having not more than 10 carbon atoms are preferred in most instances.

The first step in the process of the invention, namely molecularly to macro-colloidally dispersing the fusible non-asphaltic organic substance in asphaltic bituminous material, may be conveniently effected by heating the asphaltic bituminous material until molten and then homogeneously incorporating fusible non-asphaltic organic substance throughout the molten asphaltic bituminous material by mixing or dissolving therein. The temperature at which the two components are incorporated is not usually of a critical nature, but should be sufficient to make the resultant mixture fluid at the working temperature, i.e., usually about 175 to 250° C. The quantity of fusible non-asphaltic organic substance incorporated into the asphaltic bituminous substance may vary from as little as 0.5% by weight up to 10% by weight, or higher in some instances. Generally it is desirable to add no more than 10% by weight of the fusible non-asphaltic organic substance for economic reasons.

The molten mass resulting from the foregoing step and containing fusible non-asphaltic organic substance molecularly to macro-colloidally dispersed throughout asphaltic bituminous material is solidified by cooling to a suitable temperature and then crushed. The crushed material is classified to the desired mesh size by screening to obtain material preferably within 20 to 40 mesh in particle size. The 20 to 40 mesh material obtained thereby is then used in the following step to produce the activatable char and activated carbon of the present invention. The fines may be remelted, resolidified, recrushed and resized to yield additional 20 to 40 mesh material, and thus loss of raw material may be avoided. The use of 20 to 40 mesh material is presently preferred for purposes of the present invention and preferred products may be produced therefrom, but it is understood that material of other mesh sizes may be used.

It is apparent from the foregoing that 20 to 40 mesh material obtained as outlined above contains fusible non-asphaltic organic substance molecularly to macro-colloidally dispersed throughout the individual 20 to 40 mesh particles. The 20 to 40 mesh material is then reacted at an elevated temperature with sulfuric acid, preferably using ½ to 9 parts of concentrated sulfuric acid for each part by weight of 20 to 40 mesh material. Use of less than ½ part by weight of concentrated sulfuric acid for each part by weight of 20 to 40 mesh material will not provide a product readily wet by water when sulfonated to the point where it is just infusible. On the other hand, use of more than 9 parts by weight of concentrated sulfuric acid for each part by weight of 20 to 40 mesh material results in the presence of excess sulfuric acid which is not needed for the reaction and which requires removal by a subsequent distillation step. The temperature for the concentrated sulfuric acid treatment should preferably be between 60 and 150° C. At temperatures below 60° C. very little reaction occurs in a reasonable period of time, while at temperatures above 150° C. more charring than sulfonation takes place and the product is inferior. The reaction is also more difficult to moderate and control at temperatures above 150° C. The reaction time in the foregoing sulfonation step will vary depending upon the temperature of sulfonation, but in general it may be stated that at a sulfonation temperature of 100° C. the reaction period should be approximately 2 hours.

The excess sulfuric acid may be removed from the sulfonation reaction mixture by gradually raising the temperature to between 300 and 450° C. and continuing heating at this temperature to dryness. In this way, the excess sulfuric acid is distilled off and may be recovered, and the sulfonated product is probably further sulfonated to some extent. It is usually desirable that a temperature between 300 and 450° C. be employed when using this method of removing excess acid since at lower temperatures not all of the excess acid is removed and at higher temperatures the sulfuric acid distilled over is contaminated by organic pyrolysis products. From the standpoint of the reagent recovery it is desirable to use a lower temperature and prevent formation of organic pyrolysis products which occur at temperatures greater than 450° C. Alternatively, the excess sulfuric acid may be removed from the sulfonation mixture by the addition of a large excess of water. The solid sulfonated material is then recovered and dried at room temperature.

The final charring step of the process of the present invention is carried out at elevated temperatures and in the absence of oxygen. A temperature of about 500° C. is usually preferred for the charring operation so as to evolve any volatile and combustible substances present. It is possible to recover small amounts of sulfur-containing gases during the carbonization step but in general the yield of such gases is low. The volatile gases evolved during carbonization are rich in carbonaceous material and capable of yielding valuable by-products, or they may may be used as auxiliary fuel for the process.

The product of the foregoing steps of sulfonation, removal of excess sulfuric acid, drying, and subsequent charring is essentially of the same particle size as the original charge and consists of hard, dense, shiny particles which exhibit good mechanical strength and exceptional resistance toward attrition. This material may then be further activated by the usual methods, such as by heating to higher temperatures (800–1200° C.) in a current of steam, flue gas, carbon dioxide or other suitable atmosphere. The resultant final product is a hard, granular, activated carbon of extremely high adsorption capacity, good physical stability, and resistant to attrition, and one which is readily reactivated after exhaustion.

The beneficial effects of the process of this invention are believed to be at least partially due to the concentrated sulfuric acid treatment which probably causes simultaneous oxidation and dehydrogenation with attendant growth of molecular size, as well as sulfonation or sulfation, which may serve to eliminate or greatly reduce subsequent fusion during the charring process. This results in particle structures which are not macroporous, but instead have desirable tiny fractures in the carbon structure. Further, it is thought that the removal of the molecularly to macro-colloidally dispersed fusible non-asphaltic organic substance during the sulfonation and washing steps causes the surface area of the resultant char to be appreciably increased due to cavities created by removal of dispersed fusible non-asphaltic organic substance.

The foregoing detailed description and the following specific examples are for the purpose of illustrating the present invention only and are not to be taken as limiting to the scope of the appended claims.

Example I

A vacuum reduced petroleum asphalt was treated with ten volumes of pentane to precipitate asphaltenes, which were then separated and warmed until substantially free of pentane.

One kilogram of asphaltene prepared as outlined above was fused by heating to 204° C. and then 20 grams of phenol were slowly added thereto with vigorous agitation which served to disperse the phenol uniformly throughout the molten mass of asphaltene. The phenol tended to evaporate from the surface of the hot asphaltene and for this reason it was desirable to complete the dispersion of phenol as rapidly as possible and with simultaneous agitation, as well as use the lowest possible temperature at which a working fluidity could be achieved. The resulting molten mass was then allowed to cool until solidified and the solidified mass ground and screened to 20 to 40 mesh material. The 20 to 40 mesh material was retained for conversion to activated carbon as will be described in the following examples. The oversized material was reground and rescreened while fines were remelted, recast and reground to obtain additional material within 20 to 40 mesh particle size.

Example II 100 grams of 20 to 40 mesh material containing asphaltene having phenol molecularly to macro-colloidally dispersed throughout the individual particles and prepared as described in Example I was treated with 370 grams (200 ml.) of concentrated sulfuric acid in apparatus mounted with a powerful stirrer and vented for the escape of gases. The reaction mixture was then slowly heated to approximately 100° C. and this temperature maintained for a period of two hours, during which time large volumes of sulfur dioxide were evolved. The reaction mixture was then cooled, washed with a large excess of water and the sulfonated 20 to 40 mesh material recovered, dried at room temperature overnight and screened. The yield was 135 grams of sulfonated 20 to 40 mesh material, and a very small quantity of fines. The sulfonated material dried at ambient temperature still contained a considerable amount of moisture and thus the 135 grams of product was not indicative of yield.

100 grams of the dried 20 to 40 mesh material prepared as described above was carbonized by heating to a temperature of 500° C. in the absence of oxygen and for such period of time as necessary and until volatile material no longer escaped. The residue consisted of 60 grams of charred product which showed only slight evidence of having undergone fusion during the carbonization process. This charred product was digested with dilute sulfuric acid (during which time considerable $H_2S$ gas was evolved) and dried. The resulting dried material was then activated in a current of superheated steam at a temperature of 975° C. for a period of three minutes. The yield of activated product was 43 grams of activated carbon.

The activated material prepared as described above was tested for CCl₄ service time as outlined by Chaney and Fielder (Ind. and Eng. Chem., 11, 524, 1919) as modified by Stone and Clinton (Ind. Eng. Chem. Anal. Ed. 14, 131, 1942). Under the conditions outlined in this test, the activated material prepared as above described has a CCl₄ service time of 1613 seconds while commercial coconut charcoal adsorbent had a carbon tetrachloride service time of about 1200 seconds.

*Example III*

A starting material was prepared as described in Example I, with the exception of 20 grams of aniline being dispersed in one kilogram of asphaltenes.

A 100 gram sample of 20 to 40 mesh material prepared as described above was treated with 200 ml. of concentrated sulfuric acid in an apparatus mounted with a powerful stirrer and vented for the escape of gases. This mixture was slowly heated to a temperature of approximately 150° C., and this temperature maintained for approximtaely 2 hours. The temperature was then slowly raised to a final temperature of 400° C., heating continued until the reaction mixture was evaporated to dryness. Carbonization was then carried out on the sulfonated product thus obtained as described in Example II followed by activation of the charred product in a current of superheated steam for a period of 1 hour at 900–1000° C. The yield of activated product thus obtained and the carbon tetrachloride service time was substantially the same as described in Example II.

What is claimed is:

1. A process for producing an activatable char comprising homogeneously incorporating a sulfuric acid reactive and extractable organic substance selected from the class consisting of phenols and amines containing not more than 10 carbon atoms in asphaltic bituminous material, reacting in particulate form each part by weight of the resultant material in the presence of ½ to 9 parts by weight of concentrated sulfuric acid at a temperature of 60–150° C. to extract at least a portion of the organic substance from the asphaltic bituminous material and produce a sulfonated product readily wet by water, raising the temperature of at least the sulfonated asphaltic bituminous material product to about 300–450° C. and heating to dryness, and charring the sulfonated asphaltic bituminous material product in the absence of elemental oxygen.

2. The process of claim 1 wherein the organic substance is phenol.

3. The process of claim 1 wherein the organic substance is aniline.

4. The process of claim 1 wherein the organic substance is a lower aliphatic amine containing not more than 10 carbon atoms.

5. A process for producing an activatable char comprising homogeneously incorporating a sulfuric acid reactive and extractable organic substance selected from the class consisting of phenols and amines containing not more than 10 carbon atoms in asphaltic bituminous material in an amount from 0.5 to 10% by weight of the asphaltic bituminous material, reacting in particulate form each part by weight of the resultant material in the presence of ½ to 9 parts by weight of concentrated sulfuric acid at a temperature of 60–150° C. to extract at least a portion of the organic substance from the asphaltic bituminous material and produce a sulfonated asphaltic bituminous material product readily wet by water, raising the temperature of at least the sulfonated asphaltic bituminous material product to about 300–450° C. and heating to dryness, and charring the sulfonated asphaltic bituminous material product in the absence of elemental oxygen.

6. The process of claim 5 wherein the organic substance is phenol.

7. The process of claim 5 wherein the organic substance is aniline.

8. The process of claim 5 wherein the organic substance is a lower aliphatic amine containing not more than 10 carbon atoms.

9. A process for producing activated carbon comprising homogeneously incorporating a sulfuric acid reactive and extractable organic substance selected from the class consisting of phenols and amines containing not more than 10 carbon atoms in asphaltic bituminous material, reacting in particulate form each part by weight of the resultant material in the presence of ½ to 9 parts by weight of concentrated sulfuric acid at a temperature of 60–150° C. to extract at least a portion of the organic substance from the asphaltic bituminous material and produce a sulfonated asphaltic bituminous material product readily wet by water, raising the temperature of at least the sulfonated asphaltic bituminous material product to about 300–450° C. and heating to dryness, subsequently charring the sulfonated asphaltic bituminous material product in the absence of elemental oxygen to obtain an activatable char, and then subjecting the activatable char to the action of a carbon activating medium at a temperature of about 800–1200° C.

10. The process of claim 9 wherein the organic substance is phenol.

11. The process of claim 9 wherein the organic substance is aniline.

12. The process of claim 9 wherein the organic substance is a lower aliphatic amine containing not more than 10 carbon atoms.

13. A process for producing activated carbon comprising homogeneously incorporating a sulfuric acid reactive and extractable organic substance selected from the class consisting of phenols and amines containing not more than 10 carbon atoms in asphaltic bituminous material in an amount from 0.5 to 10% by weight of the asphaltic bituminous material, reacting in particulate form each part by weight of the resultant material in the presence of ½ to 9 parts by weight of concentrated sulfuric acid at a temperature of 60–150° C. to extract at least a portion of the organic substance from the asphaltic bituminous material and produce a sulfonated asphaltic bituminous material product readily wet by water, raising the temperature of at least the sulfonated asphaltic bituminous material product to about 300–450° C. and heating to dryness, subsequently charring the sulfonated asphaltic bituminous material product in the absence of elemental oxygen to obtain an activatable char, and then subjecting the activatable char to the action of a carbon activating medium at a temperature of about 800–1200° C.

14. The process of claim 13 wherein the organic substance is phenol.

15. The process of claim 13 wherein the organic substance is aniline.

16. The process of claim 13 wherein the organic substance is a lower aliphatic amine containing not more than 10 carbon atoms.

References Cited in the file of this patent

UNITED STATES PATENTS

| | | |
|---|---|---|
| 1,669,491 | Savage | May 15, 1928 |
| 2,067,985 | Sargent | Jan. 19, 1937 |
| 2,376,896 | Behrman | May 29, 1945 |
| 2,718,505 | Baker et al. | Sept. 20, 1955 |

UNITED STATES PATENT OFFICE

CERTIFICATE OF CORRECTION

Patent No. 2,900,351　　　　　　　　　　August 18, 1959

Mayer B. Goren et al.

It is hereby certified that error appears in the above numbered patent requiring correction and that the said Letters Patent should read as corrected below.

In the heading to the printed specification, line 2, title of invention, for "ION EXCHANGE MATERIAL" read -- PREPARATION OF ACTIVATABLE CHAR AND ACTIVATED CARBON --.

Signed and sealed this 27th day of December 1960.

(SEAL)
Attest:

KARL H. AXLINE
Attesting Officer

ROBERT C. WATSON
Commissioner of Patents